2,928,808
Patented Mar. 15, 1960

2,928,808
CURING OF POLYEPOXIDES

William J. Belanger, Louisville, Ky., assignor to Devoe & Raynolds Co., Inc., a corporation of New York No Drawing. Application December 10, 1956
Serial No. 627,149

5 Claims. (Cl. 260—47)

This invention, in one of its aspects, relates to the preparation of useful products such as encapsulating materials, laminates, pottings, castings, and the like, from epoxide resins. In another of its aspects the invention pertains to pottings, castings, moldings, laminates, and adhesives thus prepared.

In the preparation of cured compositions from glycidyl polyethers, the so called polyepoxides, many converters are employed. However, many such converters begin to react with the polyepoxide immediately upon admixture therewith, rendering the handling of these materials, and processes involving their use, difficult. This invention includes the use of a curing agent which is particularly useful for the purpose because mixtures of the curing agent with polyepoxides are stable at room temperatures. A mixture of the curing agent and polyepoxide can be retained for quite long periods since it is stable until heated. This is particularly advantageous in the case of the adhesives, castings and potting industries where some degree of compounding or other previous preparation is necessary prior to curing the composition.

It has been found that when a neutral quaternary ammonium salt is employed, compositions of this invention result which have the advantage of stability at room temperatures or at slightly higher temperatures. Mixtures of polyepoxides with alkaline curing agents, such as amine curing agents, on the other hand, are not stable at room temperatures but begin to gel immediately.

An additional advantage of the use of a neutral quaternary ammonium salt is apparent in the case of high molecular weight polyepoxides. These glycidyl polyethers having high weights per epoxide must be heated to a melt in order to incorporate a curing agent therein. To illustrate, in most cases if the glycidyl polyether must be heated to 135° C. to melt it, and an amine catalyst is added, the mixture begins to gel immediately. However, if a neutral quaternary ammonium salt is used, gel formation is very much slower, as will be illustrated by the examples. This is a distinct advantage in casting and formulating, etc., where time is a consideration. Thus, in accordance with this invention, a polyepoxide for molding, bonding, casting, etc. is provided comprising a glycidyl polyether having a 1,2-epoxy equivalency greater than one in admixture with a neutral quaternary ammonium salt.

Polyepoxides with which this invention is concerned are now well known and need not be discussed at length herein. Any of the known glycidyl polyethers having a 1,2-epoxy equivalency greater than one and a weight per epoxide of below 2500 can be used in the practice of this invention. The most useful of these epoxide resins have weights per epoxide in the range of from 140 or less to one thousand and are made from the reaction of a polyhydric phenol with epihalohydrin or glycerol dihalohydrin, and a sufficient amount of a caustic alkali to combine with the halogen of the halohydrin. Products resulting from the reaction of a polyhydric phenol with epichlorhydrin or glycerol dichlorhydrin are monomeric or straight chain polymeric products characterized by the presence of at least two epoxide groups. Dihydric phenols which can be used for this purpose include bisphenol, resorcinol, catechol, hydroquinone, methyl resorcinol, 2,2-bis(4-hydroxyphenyl)butane, 4,4'-dihydroxybenzophenone, bis(4-hydroxyphenyl)ethane, and 1,5-dihydroxy naphthalene. The preparation of polyepoxides from polyhydric phenols and epihalohydrin is described in U.S. Patents 2,467,171, 2,582,985, 2,538,072, 2,615,007 and 2,698,315, the proportion of the halohydrin (epichlorhydrin or glycerol dichlorhydrin) to dihydric phenol being at least about 1.1 to one, up to around ten to one.

Higher melting point resins are made from the reaction of such resins with a further amount of dihydric phenol less than that equivalent to the epoxide content of the resin, as set forth in U.S. Patent 2,615,008. Halohydrins can be further exemplified by 3-chloro-1,2-epoxy butane, 3-bromo-1,2-epoxy hexane, 3-chloro-1,2-epoxy octane, and the like. Another group of polyepoxides is produced by the reaction of a polyhydric alcohol with epichlorhydrin or glycerol dichlorhydrin as disclosed in Zech Patent 2,581,464.

Neutral quaternary ammonium salts within the contemplation of this invention are tetraalkyl, aryl trialkyl and alkaryl trialkyl ammonium salts of strong acids wherein the aryl, alkaryl and alkyl substituents each have no more than eight carbon atoms. By a salt of a strong acid is meant a quaternary ammonium salt of an anion of a strong acid, not that the quaternary ammonium salt is made from a strong acid. Examples of such quaternary ammonium salts are benzyltrimethyl ammonium chloride, benzyltrimethyl ammonium phosphate, trimethyl benzyl ammonium sulphates, benzyltriethyl ammonium chloride, tributyl benzyl ammonium chloride, tripropyl benzyl ammonium chloride, tolyl trimethyl ammonium chloride, octyl trimethyl ammonium bromide, ethylene bis(trimethyl ammonium bromide), etc. Preferred salts are the quaternary ammonium halides. Also intended are ion exchange resins containing quaternary ammonium salts of strong acids.

In carrying out the process of this invention the polyepoxide is mixed with the quaternary ammonium salt and the mixture is heated at an elevated temperature to effect a cure. The curing temperature is generally in the range of 90° C. to 200° C., while normal curing temperatures are in the range of 120° C. to 160° C. However, a temperature of somewhat less than 120° C. can be employed when polyepoxides having higher weights per epoxide are employed, because these polyepoxides generally contain a larger number of hydroxyl groups.

The preparation of these compositions can best be understood by reference to certain specific examples. To illustrate effectively the stability of the polyepoxide-quaternary ammonium salt mixtures, gel times are given rather than curing times, the gel being the first stage of an infusible, insoluble material. It is understood that the examples are illustrative only and other variations will occur to those skilled in the art.

Example 1

An epoxide resin is prepared in a reaction vessel fitted with a stirrer, thermometer and condenser by combining 650 parts (2.85 mols) of 2,2-bis(4-hydroxyphenyl)propane and 218 parts (5.45 mols) of sodium hydroxide (twenty percent excess) in 1900 parts of water and heating the mixture at about 29° C. for twenty minutes, whereupon 414 parts (4.48 mols) of epichlorhydrin are added rapidly. The temperature of the mixture is increased over a period of fifteen minutes to 93° C. to 100° C. and is held at this temperature for one hour and thirty-five minutes. The mixture is separated into a two phase system and the aqueous layer is drawn off. The remaining resinous layer is washed with hot water and then is drained and dried at 140° C. The Durrans' Mercury Method melting point of the resulting product is 70° C. and the weight per epoxide is 450. Hereinafter this glycidyl polyether will be referred to as Resin 450, the 450 denoting the equivalent weight per epoxide group.

Other glycidyl polyethers are prepared by the condensation of epichlorhydrin with bisphenol in the same manner as in the preceding paragraph, but using different epichlorhydrin to bisphenol ratios. These are illustrated by the following table. To avoid the need to refer back to the table from the ensuing examples, the glycidyl polyethers are designated by resin numbers, the numbers indicating the equivalent weight per epoxide group.

| Epoxide | Mols Epichlorhydrin | Mols Bisphenol |
|---|---|---|
| Resin 185 | 10.0 | 1.0 |
| Resin 250 | 2.60 | 1.0 |
| Resin 340 | 2.04 | 1.0 |
| Resin 590 | 1.40 | 1.0 |
| Resin 960 | 1.22 | 1.0 |
| Resin 1710 | 100 parts of Resin 960 plus 5 parts of bisphenol. | |

Example 2

In a suitable container, twenty parts by weight of Resin 450 are heated to 150° C., whereupon 0.50 part by weight of a sixty percent aqueous solution of benzyltrimethyl ammonium chloride is stirred into the heated glycidyl polyether. The resulting mixture, on heating at 150° C., gels in thirty minutes.

Other epoxide-benzyltrimethyl ammonium chloride mixtures, treated as in Example 2, are illustrated by the following table.

| Polyepoxide | Polyepoxide, Parts By Weight | BTMACl,[1] Parts By Weight | Temperature (° C.) | Gel Time (minutes) |
|---|---|---|---|---|
| Resin 185 | 20.0 | 1.00 | Room temp. | No gel in six months. |
| Do | 20.0 | 0.40 | 150 | 165. |
| Do | 20.0 | 0.35 | 100 | No gel in 480 minutes. |
| Do | 20.0 | 1.00 | 100 | Do. |
| Do | 20.0 | 1.00 | 150 | 120. |
| Resin 250 | 20.0 | 1.00 | 100 | No gel in 1,440 minutes. |
| Do | 20.0 | 1.00 | 150 | 140. |
| Do | 20.0 | 0.50 | 150 | 150. |
| Resin 340 | 20.0 | 1.00 | 150 | 125. |
| Do | 20.0 | 0.50 | 150 | 125. |
| Resin 450 | 20.0 | 0.50 | 125 | 90. |
| Resin 590 | 20.0 | 1.00 | 150 | 22. |
| Do | 20.0 | 1.00 | 125 | 70. |
| Do | 20.0 | 0.50 | 150 | 25. |
| Resin 960 | 20.0 | 1.00 | 150 | 22. |
| Do | 20.0 | 1.00 | 125 | 72. |
| Do | 20.0 | 0.50 | 150 | 39. |
| Resin 1710 | 20.0 | 1.00 | 150 | 10. |

[1] BTMACl represents benzyltrimethyl ammonium chloride employed as a sixty percent aqueous solution.

Example 3

In accordance with the procedure outlined in Example 2, gelled compositions are prepared by heating mixtures of polyepoxides with other quaternary ammonium chlorides, as illustrated by the following table.

| Polyepoxide Resin | Polyepoxide, Parts by Weight | Quaternary Ammonium Chloride | | | Gel Time (Min.) at 150° C. |
|---|---|---|---|---|---|
| | | Parts By Weight of A[1] | Parts By Weight of B[1] | Parts By Weight of C[1] | |
| Resin 340 | 20.0 | 1.00 | | | 365 |
| Do | 20.0 | 2.00 | | | 265 |
| Do | 20.0 | | 1.00 | | 308 |
| Do | 20.0 | | 2.00 | | 302 |
| Do | 20.0 | | | 0.50 | 440 |
| Do | 20.0 | | | 1.00 | 235 |
| Resin 590 | 20.0 | 1.00 | | | 52 |
| Do | 20.0 | 2.00 | | | 37 |
| Do | 20.0 | | 1.00 | | 18 |
| Do | 20.0 | | 2.00 | | 11 |
| Do | 20.0 | | | 0.50 | 80 |
| Do | 20.0 | | | 1.00 | 85 |

[1] A represents soyatrimethyl ammonium chloride employed as a solution consisting of 33.0 parts by weight of the ammonium salt, 17.0 parts by weight of sodium chloride and 50.0 parts by weight of water. B represents hexadecyltrimethyl ammonium chloride employed as a solution consisting of 33.0 parts by weight of the ammonium salt, 17.0 parts by weight of sodium chloride and 50.0 parts by weight of water. C represents didodecyldimethyl ammonium chloride employed as a solution consisting of 75 parts by weight of the ammonium salt and 25.0 parts by weight of isopropyl alcohol.

Example 4

In a suitable container, ten parts by weight of Resin 450 are heated to 150° C., whereupon 0.50 part by weight of anhydrous benzyltrimethyl ammonium sulphate are rapidly stirred into the heated resin. The resulting mixture is heated at 150° C. Initial gelation occurs after heating for twenty-five minutes.

In the following example, the glycidyl polyether (weight per epoxide of 340) and the quaternary ammonium chloride are reacted beyond the initial or gel stage to make useful, cross-linked, insoluble, infusible products as indicated by the properties given.

Example 5

A casting is prepared by curing a blend of two hundred parts by weight of Resin 340 with ten parts by weight of a sixty percent aqueous solution of benzyltrimethyl ammonium chloride by heating the blend at 150° C. for sixteen hours. The resulting casting has the following physical properties:

Tensile strength—6,500 pounds per square inch
Flexural strength—17,300 pounds per square inch
Rockwell hardness M—75
Impact strength—1.01 foot pounds per inch of notch From another blend of two hundred parts of Resin 340 with ten parts of a sixty percent aqueous solution of benzyltrimethyl ammonium chloride, a casting is prepared by heating at 150° C. for three hours, after which time the temperature is elevated to 180° C. and maintained at this temperature for an additional three hours. The resulting casting has the following physical properties:

Tensile strength—9,477 pounds per square inch
Flexural strength—17,000 pounds per square inch
Rockwell hardness M—71
Impact strength—1.01 foot pounds per inch of notch.

The above examples illustrate the effectiveness of the curing agents of this invention not only in the production of cured compositions such as castings, but also in the preparation of stable epoxide systems. For example, at room temperature and with an epoxide resin having a weight per epoxide of 185, containing five percent benzyltrimethyl ammonium chloride, no gel was obtained in six months. At 150° C. the composition gels in 120 minutes. And, using about five percent benzyltrimethyl ammonium chloride with an epoxide having a weight per epoxide of 250, no gel is obtained at 100° C. in 1440 minutes, whereas at 150° C. a gel is obtained in 140 minutes. In addition, five percent benzyltrimethyl ammonium chloride with the epoxide resin having a weight per epoxide of 185 results in no gel at room temperature in four months.

Products are thermosetting compositions adaptable to a variety of uses, such as compression and jet molding, and in the bonding of metals, glass and asbestos. They are suitable also for use in the production of molded structures, laminated structures, and sheets from which flat articles such as washers and the like can be cut.

The thermosetting blends may be further blended with fillers, plasticizers, colorants and other miscellaneous ingredients such as extenders. It is thus obvious that many variations will occur to those skilled in the art and are considered within the scope of this invention.

What is claimed is:

1. A method of curing a composition consisting essentially of a glycidyl polyether of a polyhydric compound of the group consisting of polyhydric alcohols and phenols having at least two phenolic hydroxyl groups that consists in heat reacting the glycidyl polyether with one to ten percent of a quaternary ammonium salt selected from the group consisting of tetraalkyl, aryl trialkyl and alkaryl trialkyl ammonium salts of strong acids wherein the aryl, alkaryl and alkyl substituents have no more than eight carbon atoms.

2. The composition resulting from the process of claim 1.

3. A composition of matter consisting essentially of a glycidyl polyether selected from the group consisting of glycidyl polyethers of polyhydric phenols and glycidyl polyethers of polyhydric alcohols and 1 to 10 percent based on the polyether of a quaternary ammonium salt selected from the group consisting of tetraalkyl, aryl trialkyl and alkaryl trialkyl ammonium salts of strong acids wherein the aryl, alkaryl and alkyl substituents have no more than eight carbon atoms.

4. The process of claim 1 wherein the quaternary ammonium salt is a quaternary ammonium halide and wherein the polyether is a glycidyl polyether of a polyhydric phenol, said polyether having an epoxide equivalent of less than one thousand, considering an epoxide equivalent as the weight of glycidyl polyether in grams per epoxide group.

5. The process of claim 1 wherein the quaternary ammonium salt is benzyltrimethyl ammonium chloride and wherein the polyether is a glycidyl polyether of a dihydric phenol, said polyether having an epoxide equivalent of less than 250, considering an epoxide equivalent as the weight of glycidyl polyether in grams per epoxide group.

References Cited in the file of this patent

UNITED STATES PATENTS

| | | |
|---|---|---|
| 2,752,269 | Condo et al. | June 26, 1956 |
| 2,768,992 | Zukas | Oct. 30, 1956 |
| 2,772,296 | Mueller | Nov. 27, 1956 |

OTHER REFERENCES

"Polymer Processes" (Schildknecht), publ. by Interscience (N.Y.), 1956 (p. 443 relied on).